United States Patent
Wydler

[15] 3,640,650
[45] Feb. 8, 1972

[54] GEAR TOOTH SYSTEM FOR GEAR PUMPS

[72] Inventor: Robert Wydler, Zurich, Switzerland

[73] Assignee: Maag Gear Wheel & Machine Company Limited, Zurich, Switzerland

[22] Filed: July 15, 1969

[21] Appl. No.: 841,866

[30] Foreign Application Priority Data

July 18, 1968  Germany .................. P 17 03 849.2

[52] U.S. Cl. ......................................... 418/206, 91/87
[51] Int. Cl. ................................................ F01c 1/18
[58] Field of Search .......... 103/126 TO; 230/141; 91/87; 123/12; 418/190, 201

[56] References Cited

UNITED STATES PATENTS

| 2,159,744 | 5/1939 | Maglott | 418/201 |
|---|---|---|---|
| 2,601,004 | 6/1952 | Cintron | 418/190 |
| 2,604,051 | 7/1952 | Johnson | 418/190 |
| 1,981,778 | 11/1934 | Brown | 103/126 TO |
| 2,243,874 | 6/1941 | Lysholm | 230/143 |
| 2,601,004 | 6/1952 | Cintron | 103/126 TO |
| 3,275,225 | 9/1966 | Schultz | 103/126 TO |

FOREIGN PATENTS OR APPLICATIONS

| 145,501 | 1/1921 | Great Britain | 230/141 |
|---|---|---|---|
| 891,017 | 3/1962 | Great Britain | 230/141 |

*Primary Examiner*—C. J. Husar
*Attorney*—McGlew and Toren

[57] ABSTRACT

In a gear tooth system for the pumping wheels of a gear pump, having an auxiliary driving transmission, the tooth profiles of the pumping gearwheels are of involute shape, the operational or working pressure angle is greater than 40°, and the transverse contact ratio is approximately 0.5.

1 Claims, 3 Drawing Figures

INVENTOR
ROBERT WYDLER
BY McGlew & Toren
ATTORNEYS

GEAR TOOTH SYSTEM FOR GEAR PUMPS

The invention relates to a gear tooth system for the pumping wheels of a gear pump having a large delivery rate and a minimum number of teeth. In such gear tooth systems having less than 10 teeth per wheel there is no kinematic relationship between the meshing pumping wheels, that is to say the meshing pumping wheels do not drive each other. An auxiliary transmission is, therefore, provided to ensure positive drive of the intermeshing pumping wheels.

Known gear tooth systems of the kind referred to are used, for example, in the wheels of rotary piston pumps operating on the "Roots" principle, or foodstuffs pumps in which the wheels rotate relatively slowly owing to the very high viscosity and sensitivity of the conveyed medium. Known gear tooth systems on wheels having two, three or four teeth per wheel do not have an involute profile, or have an involute profile over only part of the flank length, but in most cases the profile is determined by experiment.

In particular, the teeth of such gear tooth systems are provided at the tip and root with radii in order to prevent pinching of the conveyed medium between the two sealing positions normally provided and adapted to coincide in each case with the line of contact between the two flanks of the intermeshing wheels and which seal the delivery chamber from the suction chamber. However, the profile shape, deviating from the involute shape does not ensure reliable sealing, so that gear pumps provided with known gear tooth systems do not permit the production of large pressures in the conveyed medium.

It is the object of the invention to provide an improved gear tooth system for gear pumps, in which pinching of the conveyed medium is avoided, while reliable sealing is always provided between the delivery and suction chambers of the pump.

To solve this problem a gear tooth system according to the invention provides that the tooth profiles of the pumping gearwheels have an involute shape, the operational or working pressure angle is greater than 40°, and the contact or transverse ratio is approximately 0.5.

With a gear tooth system constructed in accordance with this invention there will be only one sealing position between the two pumping gearwheels if no account is taken of the wheel position when changing from one to the other of the two flanks, in which state two sealing positions will momentarily exist. Pinching of the conveyed medium is therefore eliminated so that the detrimental side effects of pinching, namely undesirable mechanical effects on the conveyed medium and irregular running, cannot occur.

By virtue of the involute shape, it is possible for the tooth profiles of the two pumping wheels to be simply produced by the gear generating method, and for said profiles to be accurately matched to each other to ensure reliable sealing and therefore also to permit the production of high pressure.

One embodiment of the invention is shown in the accompanying drawings, in which.

Figure 1:
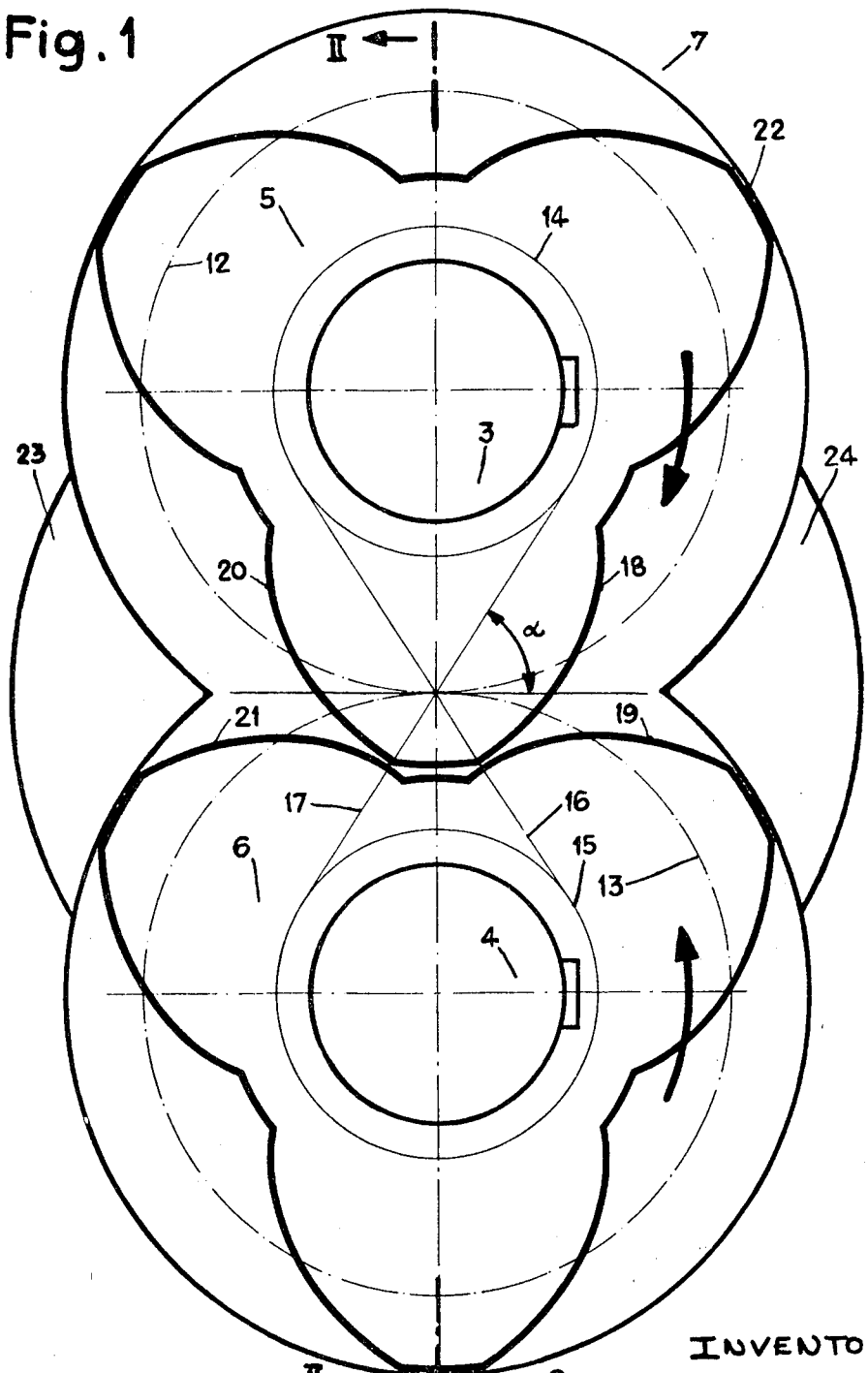
FIG. 1 is an end elevation of the pumping gearwheels of a gear pump looking in the direction of the arrows I—I in FIG. 2.
Figure 2:
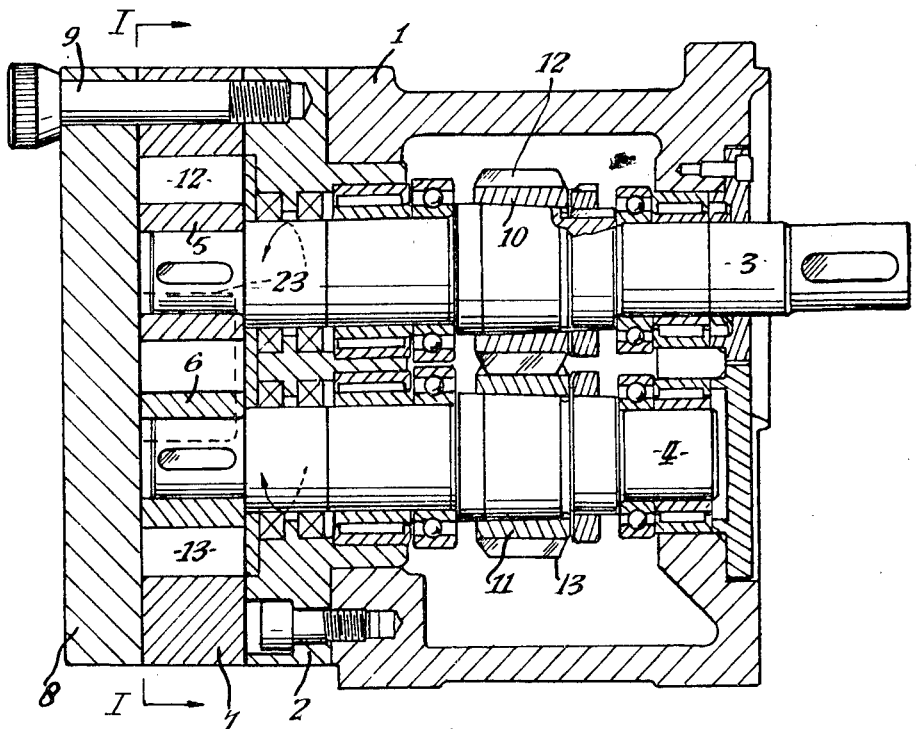
FIG. 2 is a sectional elevation of a gear pump taken along the line II—II in FIG. 1, and to a smaller scale.

Two shafts 3 and 4 are journaled in a gear pump housing 1 and an end flange 2 thereof. Mounted on one end of both of the two shafts 3 and 4 are two pumping gearwheels 5 and 6 respectively each having three teeth and being surrounded by an intermediate plate 7 and enclosed by a cover 8 and the flange 2 which secured together by screws 9. Two gearwheels 10 and 11 are mounted, in parallel to the pump gearwheels 5 and 6, on the two shafts 3 and 4 in the interior of the housing 1 to function as auxiliary transmission, that is to say, they provide the drive from the shaft 3 to the shaft 4 without relying upon the pump gearwheel to the other. The auxiliary transmission 10, 11 ensures the positive drive of both pumping gearwheels 5 and 6.

The wheels 5 and 6 and the wheels 10 and 11 have pitch circles 12 and 13 of identical diameter. The base circles of the wheels 5 and 6 have the reference numerals 14 and 15 and the line action of the two right-hand flanks 18 and 19 has the reference numeral 16, while the line of action of the two left-hand flanks 20 and 21 has the reference numeral 17. The position of the two wheels relative to each other which is illustrated in FIG. 1 corresponds to the instantaneous changeover of the seal from the left-hand flanks 20 and 21 to the right-hand flanks 18 and 19, the two lines of action 16 and 17 passing through the points of intersection of the tip or addendum circle 22 with the tooth profiles 18 and 20. The operational or working pressure angle $\alpha$ for both profiles is 56° 45'.

Rotation of the two shafts 3 and 4 in the direction of the arrows causes the conveyed material to be carried from the suction chamber 23 into the delivery chamber 24, the three teeth of the pumping gearwheels 5 and 6 producing very large tooth gaps in which a correspondingly large amount of conveyed material can be accommodated and which facilitates cleaning of the wheels.

Figure 3:
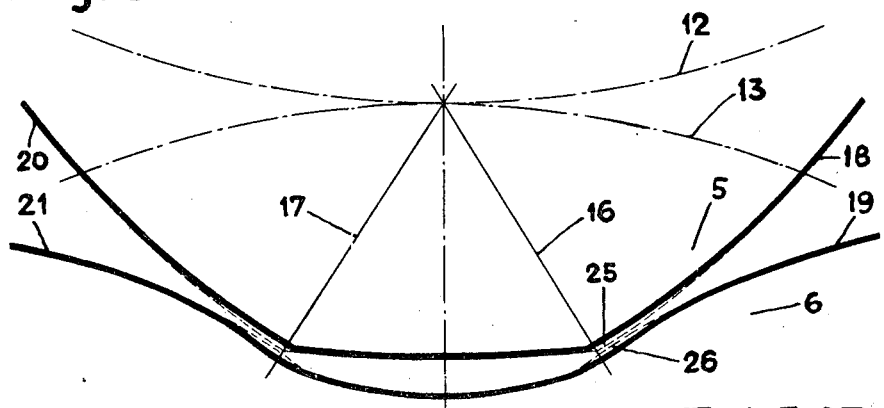
FIG. 3 is a fragmentary view similar to a part of FIG. 1, but to a larger scale, showing corrected root and tip portions of the flanks of gearwheel teeth.

Pump operation can be favorably influenced by correcting the flanks adjoining the roots and tips of the pumping gearwheels 5 and 6 as shown in FIG. 3. The relief 25 of a flank adjoining the tooth at the tooth tip and the relief 26 of a tooth at the flank adjoining the tooth root are substantially greater than in conventional gear transmissions, for example, of the order of 10 to 1, the profile relief being applied solely to ensure impact-free power transmission.

What I claim and desire to secure by Letters Patent is:

1. In a gear pump including a pair of intermeshed pumping gear wheels each having not more than 10 teeth, a pair of auxiliary driving transmission means operating in parallel and each arranged to drive one of said gear wheels, wherein the improvement comprises that the flanks of the teeth of said pumping gear wheels have an involute shape, the operational pressure angle is greater than 40°, the contact ratio is approximately 0.5 with only one flank on each of the intermeshed teeth of said gear wheels being in contact except when the contact changes from one flank to another, the flanks of the teeth having relief corrections adjoining the roots and tips of the teeth, and the magnitude of the relief corrections being of the order of 10 times of that conventionally applied to power transmitting teeth for ensuring impact-free power transmission.

* * * * *